(12) United States Patent
Nicholson

(10) Patent No.: US 7,673,247 B1
(45) Date of Patent: Mar. 2, 2010

(54) IDENTIFYING NONCOMPLYING DATAPOINTS IN CONTROL CHARTS

(75) Inventor: Donald J. Nicholson, Lansing, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 923 days.

(21) Appl. No.: 10/305,101

(22) Filed: Nov. 27, 2002

(51) Int. Cl.
*G06F 3/048* (2006.01)
(52) U.S. Cl. .................... 715/764; 715/215
(58) Field of Classification Search ......... 715/503, 715/965, 970
See application file for complete search history.

(56) References Cited

U.S. PATENT DOCUMENTS

| | | | | |
|---|---|---|---|---|
| 4,967,381 A | * | 10/1990 | Lane et al. ............ 702/81 |
| 5,010,224 A | * | 4/1991 | Shirey et al. ........... 219/69.17 |
| 5,199,439 A | * | 4/1993 | Zimmerman et al. ...... 600/483 |
| 5,226,118 A | * | 7/1993 | Baker et al. ............ 715/833 |
| 5,735,546 A | * | 4/1998 | Kurtzberg et al. ........ 283/67 |
| 6,067,509 A | * | 5/2000 | Gaiski .................. 702/170 |
| 6,381,635 B1 | * | 4/2002 | Hoyer et al. ............ 709/207 |
| 6,700,575 B1 | * | 3/2004 | Bovarnick et al. ........ 345/440 |
| 6,839,713 B1 | * | 1/2005 | Shi et al. ............... 707/101 |
| 2002/0091994 A1 | * | 7/2002 | McCready et al. ........ 717/124 |
| 2002/0113792 A1 | * | 8/2002 | Pena-Nieves et al. ..... 345/440 |
| 2003/0135406 A1 | * | 7/2003 | Rowe .................... 705/11 |

OTHER PUBLICATIONS

Chambers, David S. and Wheeler, Donald J., "Understanding Statistical Process Control", Second Edition, pp. vi, 48-50; 96-97; 214-219, 1992, SPC Press, Inc., Knoxville, TN.

* cited by examiner

*Primary Examiner*—Boris Pesin

(57) ABSTRACT

Control limit values may be related to noncomplying points by receiving a user selection indicating one or more datapoints to be used in a control limit operation, calculating control limit values based on the datapoints, wherein the control limit values indicate one or more noncomplying points that are not within an expected range, generating a display relating the control limit values to the noncomplying points, and identifying the noncomplying points in the generated display.

47 Claims, 11 Drawing Sheets

Cost Performance Index

| Color | Actual Week | Weekly CPI | Z | mR | mZ |
|---|---|---|---|---|---|
| | 8/19/01 | 1 | 0.686182 | | |
| | 8/26/01 | 1 | 0.686182 | 0 | 1.32316715 |
| | 9/2/01 | 0.963455141 | 0.396656 | 0.036545 | -0.983654805 |
| | 9/9/01 | 1.048167586 | 1.067788 | 0.084712 | -0.5359165 |
| X | 9/16/01 | 1.247706413 | 2.648626 | | |
| X | 9/23/01 | 1.354166627 | 3.492054 | | |
| | 9/30/01 | 1.069153786 | 1.23405 | 0.020986 | -1.12813796 |
| | 10/7/01 | 0.898888886 | -0.11487 | 0.170265 | 0.259140521 |
| | 10/14/01 | 0.966887414 | 0.423848 | 0.067999 | -0.69124246 |
| | 10/21/01 | 1.027472496 | 0.903831 | 0.060585 | -0.76013719 |
| | 10/28/01 | 1.100887775 | 1.485461 | 0.073415 | -0.64090345 |
| | 11/4/01 | 1.066276789 | 1.211257 | 0.034611 | -1.00151994 |
| | 11/11/01 | 0.996197701 | 0.656058 | 0.070079 | -0.67190738 |
| | 11/18/01 | 1.036101103 | 0.972191 | 0.039903 | -0.9523364 |
| | 11/25/01 | 1.03061223 | 0.928706 | 0.005489 | -1.27221579 |
| | 12/2/01 | 0.88045007 | -0.26095 | 0.150162 | 0.07232152 |
| | 12/9/01 | 0.776729584 | -1.08267 | 0.10372 | -0.35927077 |
| | 12/16/01 | 1.118644118 | 1.626135 | 0.341915 | 1.854316825 |
| | 12/23/01 | 0.9375 | 0.191026 | 0.181144 | 0.360243397 |
| | 12/30/01 | 0.45161289 | -3.65839 | 0.485887 | 3.192284373 |
| | 1/6/02 | 0.307999998 | -4.79616 | 0.143613 | 0.011145778 |
| | 1/13/02 | 0.575107276 | -2.68002 | 0.267107 | 1.159117194 |
| | 1/20/02 | 1.030219793 | 0.925597 | 0.455113 | 2.906289579 |
| | 1/27/02 | 0.805655582 | -0.18543 | 0.224664 | 0.764684811 |
| | 2/3/02 | 0.920000017 | 0.052385 | 0.114444 | -0.25961095 |

Fig. 2

Flow chart of control chart generation

IDENTIFYING NONCOMPLYING DATAPOINTS IN CONTROL CHARTS

TECHNICAL FIELD

This document relates to control charts.

BACKGROUND

Managing complex development programs such as software development projects may pose several challenges. Because software may include a large intellectual component rather than a physical component, it may be difficult to visualize and understand the development program. Tools may help managers in development programs understand the state of their development programs and, as a result, to better manage the development programs.

SUMMARY

Control limit values may be related to noncomplying points by receiving a user selection indicating one or more datapoints to be used in a control limit operation, calculating control limit values based on the datapoints, generating a display relating the control limit values to the noncomplying points, and identifying the noncomplying points in the generated display. The control limit values may indicate one or more noncomplying points that are not within an expected range.

Implementations may include one or more of the following features. For example, identifying the noncomplying points may include color-coding the noncomplying points. The noncomplying points may be color coded differently than other control limit values. The color-coding used for datapoints falling in a common classification may be maintained between a control limit chart and a control limit spreadsheet. Identifying the noncomplying points may include accenting a line in a control chart. Receiving the user selection may include retrieving modeled limits for the datapoints.

Receiving the user selection may include retrieving datapoints used in a program management application that is different than the application generating the display. Identifying the noncomplying points may include highlighting datapoints in a spreadsheet. Calculating the control limit values may include identifying two or more periods during a process for which the control limit values were calculated. The periods may relate different processes used during a time from which datapoints were derived. Different control limit values may be calculated for each of the periods. Generating the display may include displaying the different control limit values for each of the periods.

Generating the display may include displaying a moving range, a relative cost indicator, and an estimated overage. The user may be enabled to launch an investigative agent related to a datapoint appearing in the display. Enabling the user to launch the investigative agent may include enabling the user to select the datapoint by acting on a graphical representation of the datapoint.

The user may be enabled to exclude datapoints before calculating the control limit values, or to operate on a subset of the control limit values. Enabling the user to operate on the subset of the control limit values may include enabling the user to retrieve one or more constituent tasks related to the control limit values. Enabling the user to operate on the subset of the control limit values may include enabling the user to modify a task used in calculating the control limit values. Interfacing with a program management application and generating a message in response to the user may include operating on the subset of the control limit values. The message may include an automated request for additional information, a change to a task being performed, or a change to a configuration determining how the control limit values are calculated.

The details of particular implementations are set forth in the accompanying drawings and the description below. Other features will be apparent from the description and drawings, and from the claims.

DESCRIPTION OF DRAWINGS

FIG. 2 illustrates an amplified control chart that is generated in a spreadsheet format.

Like reference symbols in the various drawings indicate like elements.

DETAILED DESCRIPTION

Generally, control limit values may be related to noncomplying points by receiving a user selection indicating one or more datapoints to be used in a control limit operation, calculating control limit values based on the datapoints, generating a display relating the control limit values to the noncomplying points, and identifying the noncomplying points in the generated display. The control limit values indicate one or more noncomplying points that are not within an expected range.

For example, a program manager may be trying to gauge costs in a software development program. In trying to assess the effort, the program manager may wish to see a control chart that describes costs and indicates which portions and times in the effort deviate beyond recognized thresholds. This information may be graphically represented in a computer-generated display, such as, for example, in a spreadsheet or a graph of varying formats.

Thus, the program manager may initially determine which datapoints will be used in the control limit operation that will generate the control limit values. For example, the program manager may select datapoints beginning when a key portion of a program started and ending when the key portion of the program finished. Control limit values may be calculated for these datapoints and noncomplying points that do not fall within the expected range may be identified. A chart may be generated using these control limit values. For example, the cost associated with a particular date may be plotted against a mean periodic cost for the program. Noncomplying points may be identified as those points that fall outside of three standard deviations of a cost. These noncomplying points may be identified and attention to their noncomplying status may be amplified in the control chart. For example, the noncomplying points may be color-coded differently, and a noncomplying datapoint may be circled.

Figure 1:
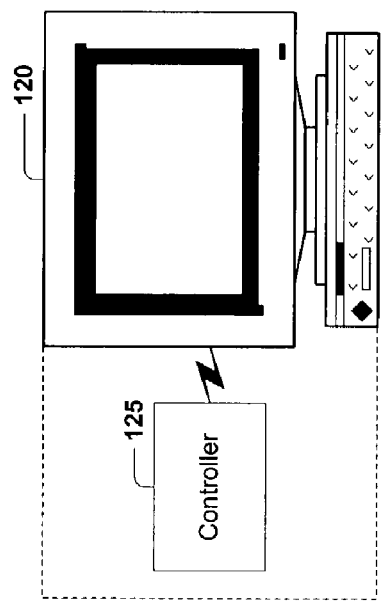
FIG. 1 illustrates a computer system that generates control charts and enables a user to interface with the generated control charts.

FIG. 1 shows a computer system 100 configured to perform control limit operations and generate control charts. Specifically, the computer system 100 is configured to identify noncomplying points in the generated control charts. For example, the noncomplying datapoints may be color-coded, or noncomplying regions may be demarked. The computer system 100 then may enable a user to investigate the noncomplying datapoints.

The computer system 100 includes a computer device 120 and a computer controller 125. The computer system 100 typically includes one or more computer devices 120 and/or computer controllers 125. For example, the computer system 100 may include one or more general-purpose computers (e.g., personal computers), one or more special-purpose computers (e.g., devices specifically programmed to communicate with each other and/or other systems), or a combination of one or more general-purpose computers and one or more special-purpose computers. The computer system 100 may be arranged to operate within or in concert with one or more other systems, such as, for example, one or more LANs ("Local Area Networks") and/or one or more WANs ("Wide Area Networks").

Each computer device 120 and computer controller 125 typically includes one or more hardware components and/or software components. An example of a computer device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of a computer controller 125 is a software application loaded on the computer device 120 for commanding and directing communications enabled by the computer device 120. Other examples include a program, a piece of code, an instruction, a device, a computer, a computer system, or a combination thereof, for independently or collectively instructing the computer device 120 to interact and operate as described herein. The computer controller 125 may be embodied permanently or temporarily in any type of machine, component, equipment, storage medium, or propagated signal capable of providing instructions to the computer device 120.

FIG. 2 shows a control chart 200 that illustrates how noncomplying datapoints may be identified. Specifically, FIG. 2 shows how control limit values may be calculated, and that the noncomplying datapoints may be determined and identified automatically. In this case, the elements in the spreadsheet are automatically color-coded.

The control chart 200 is implemented as a spreadsheet that manages a cost performance index (CPI). The control chart 200 includes columns that indicate the color, describe the date, indicate the weekly CPI, indicate the Z value, indicate the moving range, and indicate the mean Z deviation. The color column may be used to denote which ranges are used for which control limit values. In FIG. 2, the color column indicates that the rows are all part of the same range. The color column also may be used to exclude certain datapoints, as is indicated by the X appearing in rows 7 and 8. Generally, the weekly Z value is calculated by calculating the mean cost and calculating the normalized difference between the present cost and the mean cost. The Z value describes the normalized deviation between the present CPI value and the mean CPI value. The Z value normalized difference may take this difference and divide the difference by the standard deviation. The moving range (e.g., mean R) and describes how the current cost and Z values differ from previous datapoints. The mean Z column indicates the normalized differences for the moving range. For example, the moving range difference may be calculated by the difference between moving range difference and the mean moving range difference divided by the mean moving deviation. Across the 24 dates used as datapoints, the spreadsheet tracks the program's CPI.

Control chart 200 identifies noncomplying datapoints and highlights the datapoints based on the nature of the noncompliance. For example, datapoints 210-270 all represent noncomplying datapoints that have been coded differently. Datapoints 210 and 240 are color coded to a first color that indicates that that their cost differs by more than a standard deviation but by less than two standard deviations. This standard deviation is shown with Z column absolute values of greater than one but less than two standard deviations. In the adjacent rows, datapoints 220 and 270 are color-coded to a second color that indicates that they differ from the mean by more than two but less than three standard deviations. Finally, a third color identifies datapoints 230, 250 and 260 that each differ by more than three standard deviations.

Although in this instance, the control chart color-codes the noncomplying points, other actions may be performed with the identified noncomplying points. For example, the user may double click on the noncomplying points to retrieve additional information about the events related to the noncomplying points. In one instance, a message may be generated to request more information about the noncomplying points.

Figure 3:
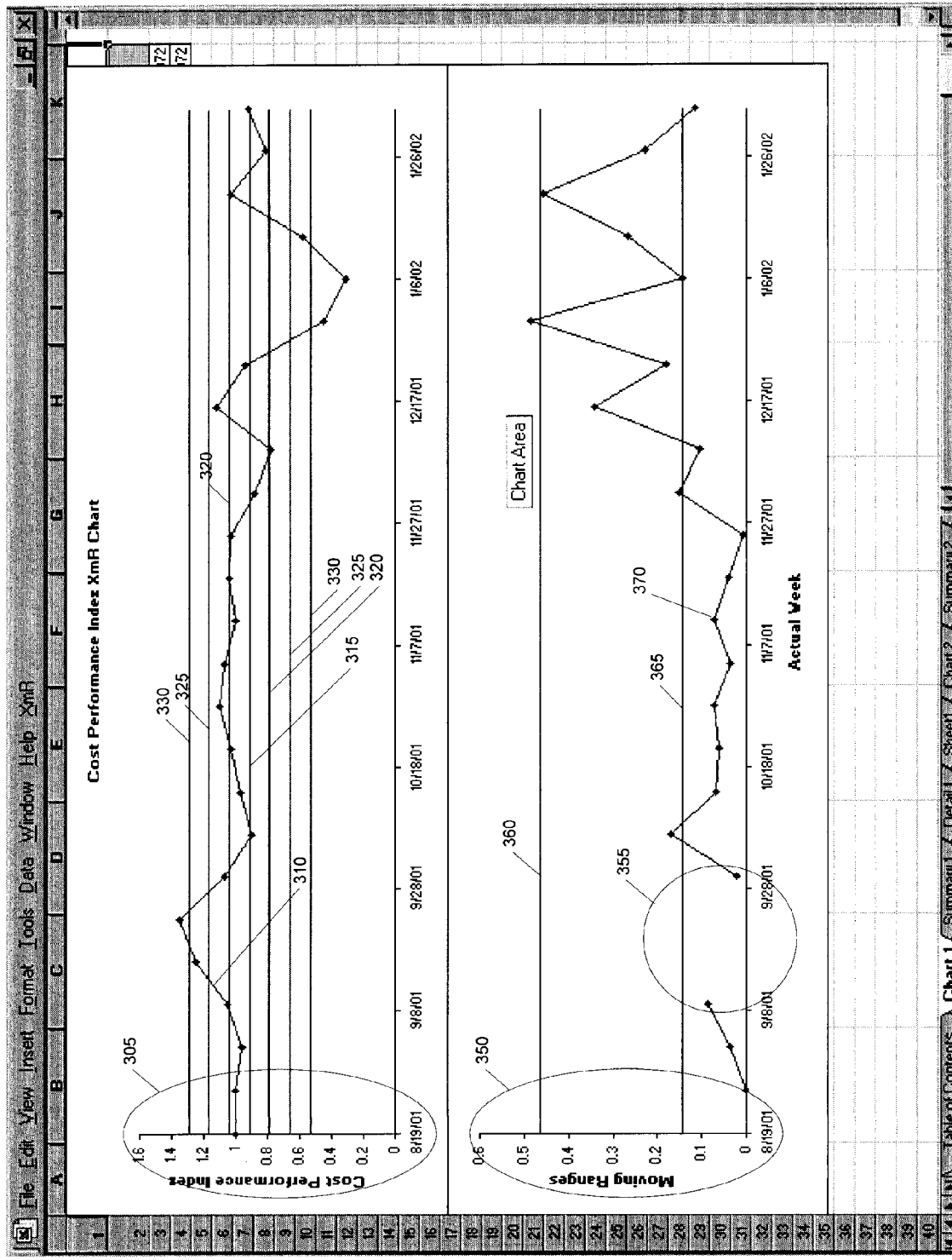
FIG. 3 illustrates amplified control charts that highlight noncomplying points and show noncomplying values.

Referring to FIG. 3, two control charts 300 graph the values used in the control chart in FIG. 2. Specifically, FIG. 3 illustrates how noncomplying datapoints may be identified in a graph by plotting lines that demark the boundaries beyond which noncomplying datapoints fall. These boundaries may be color-coded to designate the degree of noncompliance in accordance with the color-coding scheme described in FIG. 2.

FIG. 3 includes a first chart that plots the CPI values against the mean, and a second chart that plots the moving ranges. The first chart plots the changing value line 310 against a CPI index 305 on a timeline. For each datapoint used in the control chart, a CPI value is plotted. The plotted datapoints are connected to generate changing value line 310. The CPI index is normalized so that the mean CPI value is represented by one and is carried across the graph with a mean value line 315. The CPI index includes noncomplying markers 320, 325 and 330 that indicate CPI values that occur more than one, two and three standard deviations beyond the mean CPI. Each noncomplying marker may be displayed both above and below the mean value line 315. For example, there is a first noncomplying marker 320 that is one standard deviation above (and below) the mean value line and a second noncomplying marker 325 that is two standard deviations above (and below) the mean value line. These noncomplying markers may be color coded to indicate the degree of noncompliance. This color-coding scheme may be maintained with other color-coding schemes used in related control charts. In addition to color-coding the noncomplying marker, the zones between the noncomplying markers also may be color coded to indicate the degree of noncompliance (not shown).

The moving range graph describes the change between a CPI datapoint and the previous CPI value. The moving range graph includes a moving range axis 350 that indicates the magnitude of the moving range. The moving range graph also includes an X-axis that provides a timeline for the datapoints. The moving range graph includes two horizontal lines (moving range lines 360 and 365) to highlight datapoints having moving ranges of more than 0.15 and 0.45, respectively.

The moving range chart also includes a gap 355. A user may elect to not include some datapoints in a control limit operation. For example, the values for some datapoints may be so different that they obscure subsequent analysis of datapoints having less drastic value differences. Thus, a user may elect to discontinue some datapoints appearing in the user-selected range.

In FIG. 3, the moving range graph includes a gap 355 for the datapoints that have been excluded. A gap may be created because the user has investigated the datapoints and can account for the differences. Excluding datapoints in the gap may identify additional noncomplying points for the user. The user may investigate the related events so that subsequent remediation may be made.

For example, in FIG. 3, with the datapoints corresponding to the gap 355 excluded, the user may investigate the points where the moving range plot 370 lies beyond the moving range line 365. Absent the excluded gap, the datapoints may not have fallen beyond moving range plot 370 and the user may not have identified a discrepancy. Note that a discrepancy need not actually have occurred. Rather, based on the moving range values, the moving range graph indicates that there was a dramatic shift in the CPI at that time, possibly because of an event meriting investigation.

Figure 4:
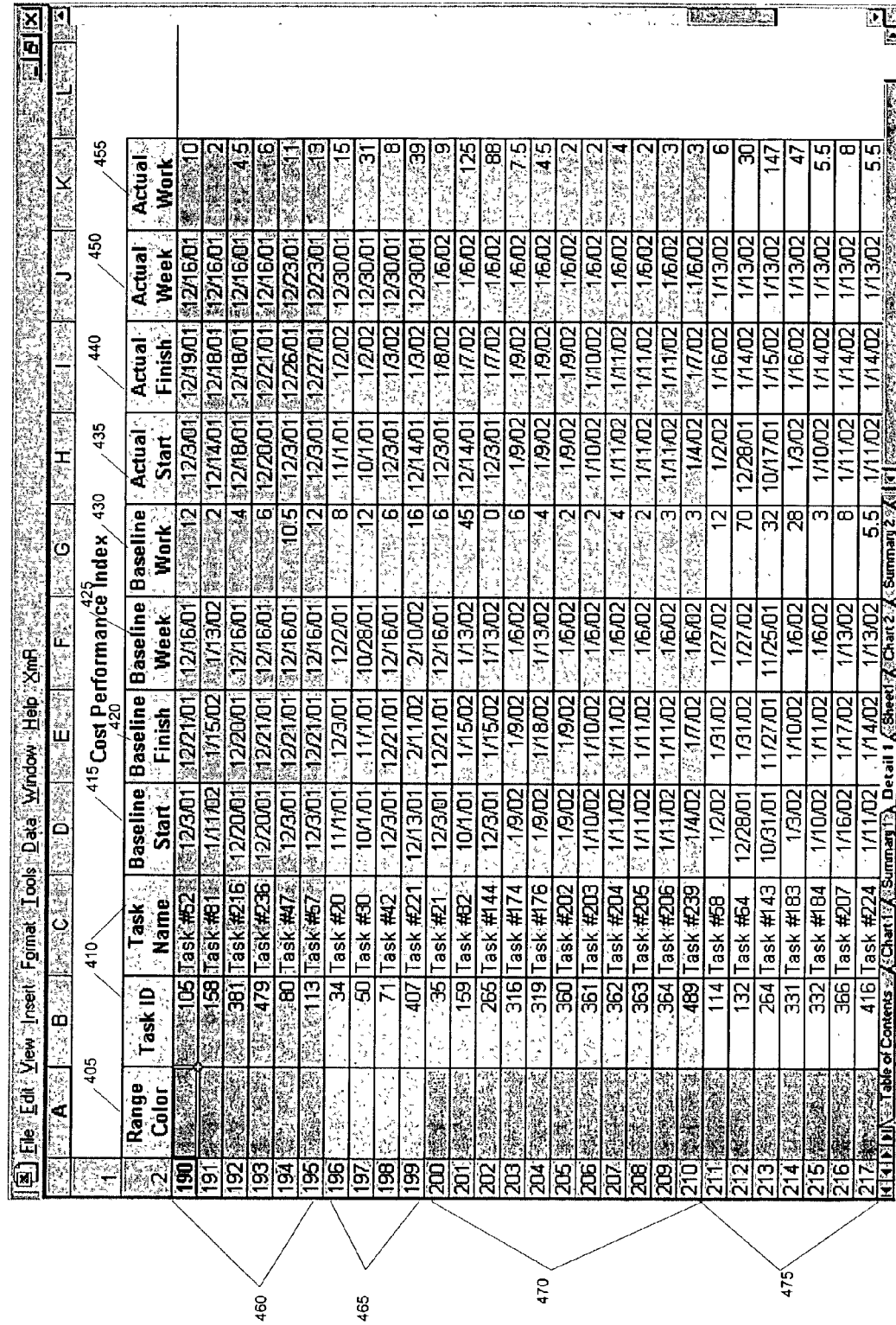
FIG. 4 illustrates an amplified control chart that shows constituent elements in a noncomplying point.

Referring to FIG. 4, a control chart 400 shows greater detail to indicate the constituent elements that may be responsible for a noncomplying datapoint. For example, the datapoints that were plotted previously may be an aggregation of multiple factors. A user may investigate the noncomplying datapoints identified in FIGS. 2 and 3 by reviewing the constituent elements shown in FIG. 4. Control chart 400 includes columns for the range color 405, the task ID and the task name 410, the baseline start 415, the baseline finish 420, the baseline week 425, the baseline work (e.g., cost) 430, the actual start 435, the actual finish 440, the actual week 450, and the actual work 455. Generally, the baseline values represent values that were set in the planning/design phase of a program while the actual values represent the actual values at which the program performed or was measured. The range color 405 represents the color-coding for a particular task based on the control limit value for the task. The task ID 410 represents an identifying label used to describe the task. Note that multiple tasks may be combined to generate the datapoints described previously. The task name includes another label that may be used to indicate the underlying process. While both the task ID and the task name are numerical in this example, in other implementations the task ID may be the product of an automated program manager, and the task name may be a more descriptive label used to identify the task for a user. For example, the task ID may be a number while the task name may read "complete program requirements document."

The control chart 400 has been color coded into ranges 460, 465, 470, and 475, with the color-coding identifying the datapoints as noncomplying and indicating the degree of noncompliance. This color-coding scheme may be consistent with the color-coding scheme of noncompliance described previously.

For example, the range 460 describes the datapoints for two weeks and the constituent tasks as being normal with a first color. The range 465 describes the datapoints for one week, indicates that the associated tasks include noncomplying points, and has been color-coded accordingly. Range 470 represents one week and has been similarly color-coded. Range 475 also is noncomplying, but to a different degree than the previous ranges. Accordingly, range 475 is color-coded differently than ranges 465 and 470.

Control chart 400 may be used to generate the control charts described previously with respect to FIGS. 2 and 3. Alternatively, control chart 400 may be displayed when a user launches an investigative agent for noncomplying points. Control chart 400 may be similarly investigated. For example, a user may initially use the displays described in FIGS. 2 and 3 to provide an overview of a software development process. The user then may click through noncomplying points to display control chart 400 and learn what tasks led to the noncompliance. A user also may click through elements in control chart 400 to further investigate a particular task that may be responsible for the noncompliance. The user then may take corrective action. For example, a program manager may adjust the staffing or resources committed to a problematic task. Alternatively, the program manager may put in place new procedures that are designed to prevent the problem from reoccurring in the future.

Figure 5:
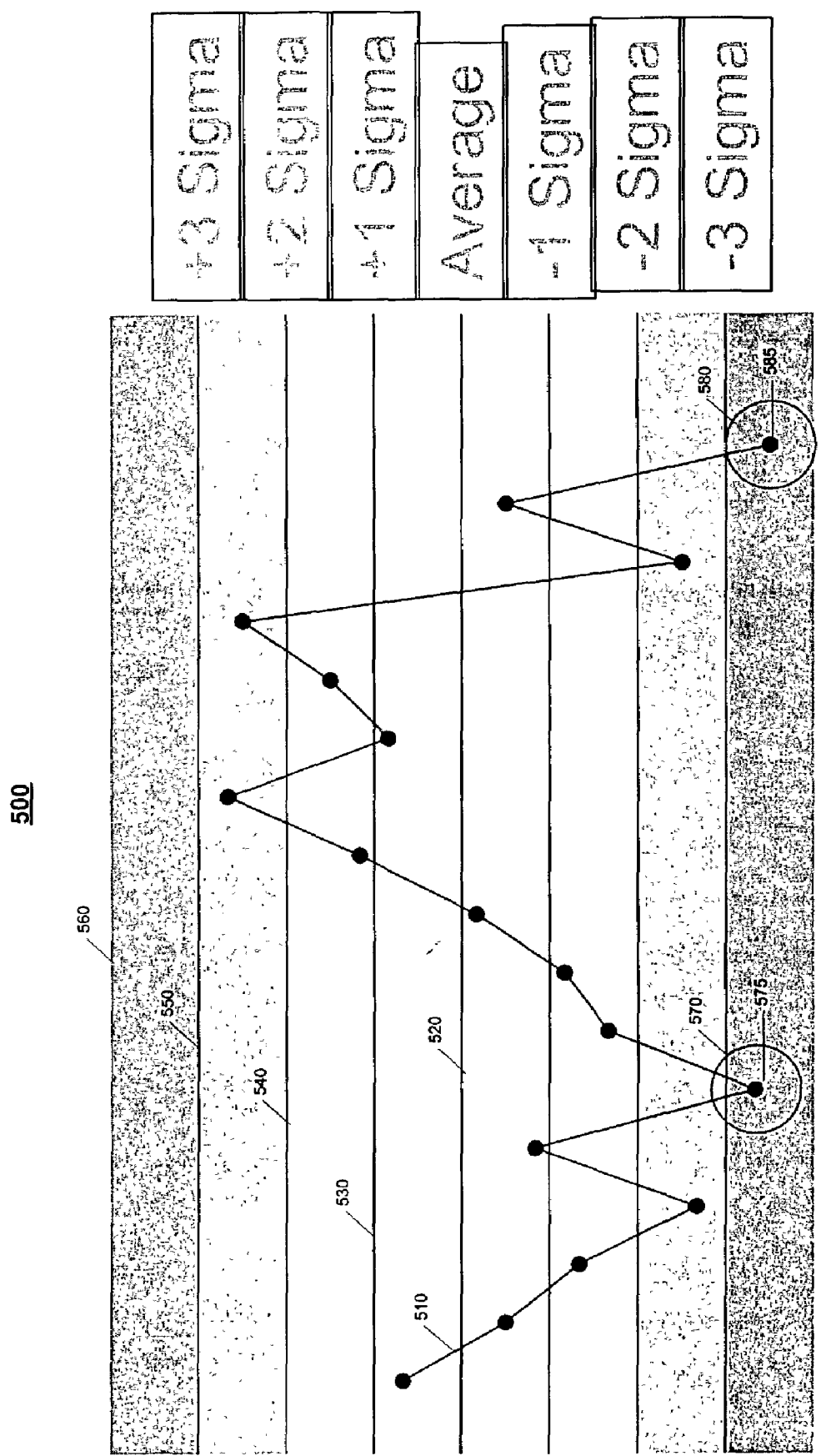
FIG. 5 illustrates an amplified control chart that highlights noncomplying points.

Referring to FIG. 5, a control chart graph 500 shows how noncomplying points may be identified for a user. Specifically, the graphical icon used to identify the noncomplying datapoints may be amplified by adding additional graphical structures to call additional attention to the noncomplying datapoints. The control chart graph 500 generally relates to the control chart graphs described previously with respect to FIGS. 2-4 and indicates how a noncomplying point may be highlighted. In this instance, the noncomplying datapoints are highlighted by generating an oval display around the non-complying datapoints.

Control chart graph 500 includes a control chart line 510 that deviates around a mean control line 520. The control chart graph 500 color codes the regions that fall within one standard deviation in zone 530, within two standard deviations but more than one standard deviation in zone 540, between two and three standard deviations in zone 550, and more than three standard deviations in zone 560. The control chart graph 500 has identified two noncomplying points 575 and 585 on control chart line 510. These noncomplying points have been identified using circles 570 and 580 to highlight and call attention to the noncomplying points. The user may click through or act on the circles to launch corrective action (e.g., launch an investigative agent).

Figure 6:
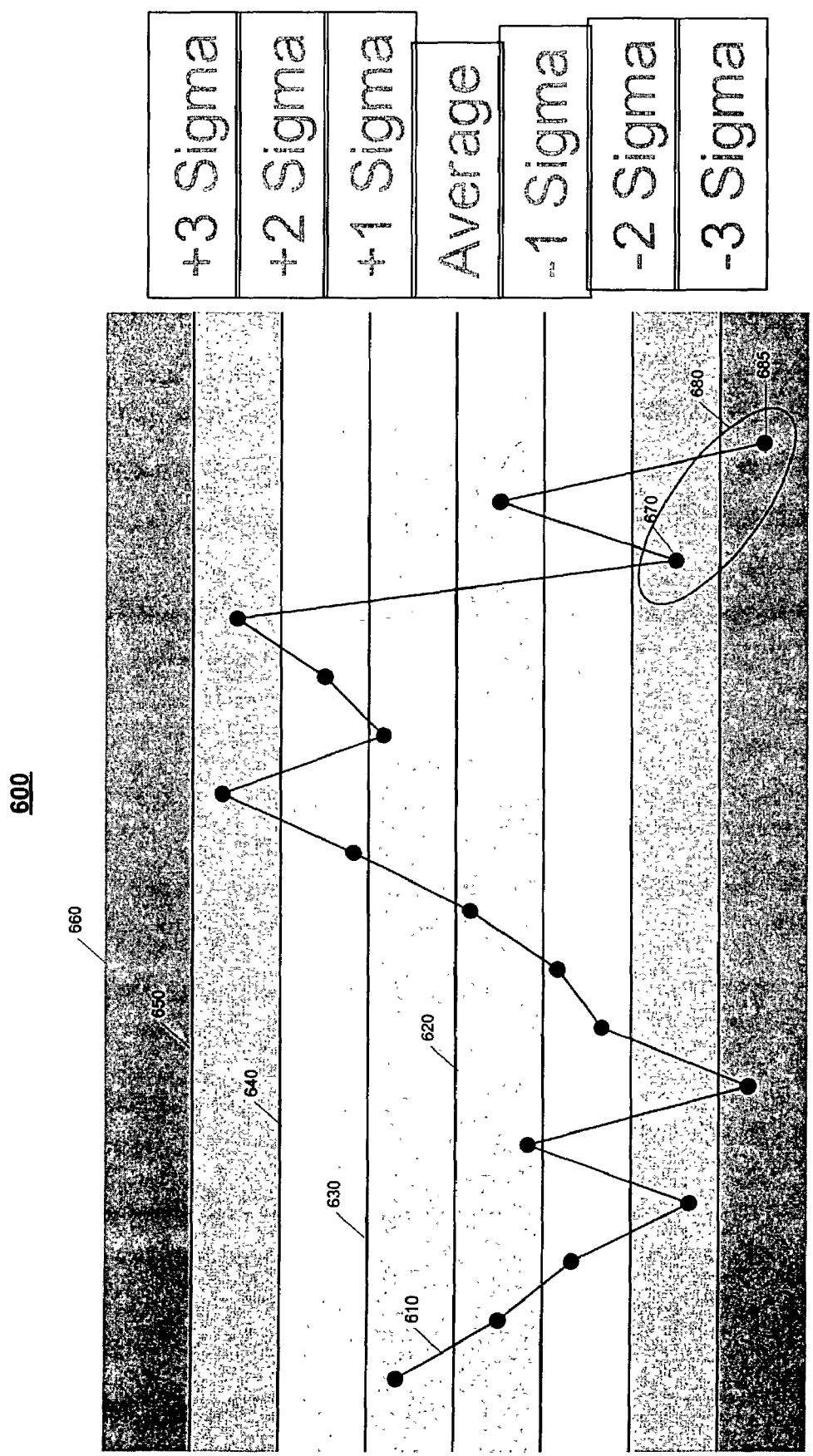
FIG. 6 illustrates an amplified control chart that highlights noncomplying points based on the relationship of a datapoint with neighboring datapoints.

Referring to FIG. 6, a control chart graph 600 indicates how different forms of noncomplying points may be identified. Specifically, the control chart graph 600 illustrates how the amplified display described in FIG. 5 may be applied to other forms of noncomplying datapoints. FIG. 6 illustrates noncomplying points that are identified based on the relationship of a datapoint to its neighboring datapoints. In other regards, the control chart graph 600 generally relates to the control chart graphs described previously with respect to FIGS. 2-5. For example, control chart graph 600 includes control chart line 610 that deviates around a mean control line 620. The control chart graph 600 has color coded the regions that fall within one standard deviation in zone 630, between one and two standard deviations in zone 640, between two and three standard deviations in zone 650, and more than three standard deviations in zone 660.

Although some noncomplying points may be identified by where they fall individually in control limit values, other noncomplying points may be identified based on where a datapoint lies with respect to its neighbors. For example, in FIG. 6, a noncomplying oval region 680 is identified when two out of three neighboring points fall more than two standard deviations beyond the mean. In this case, datapoints 670 and 685 result in the identification of the noncomplying oval region 680. As in FIG. 5, a graphical icon (i.e., an oval) calls a user's attention to the condition and may be used as an investigative agent.

Figure 7:
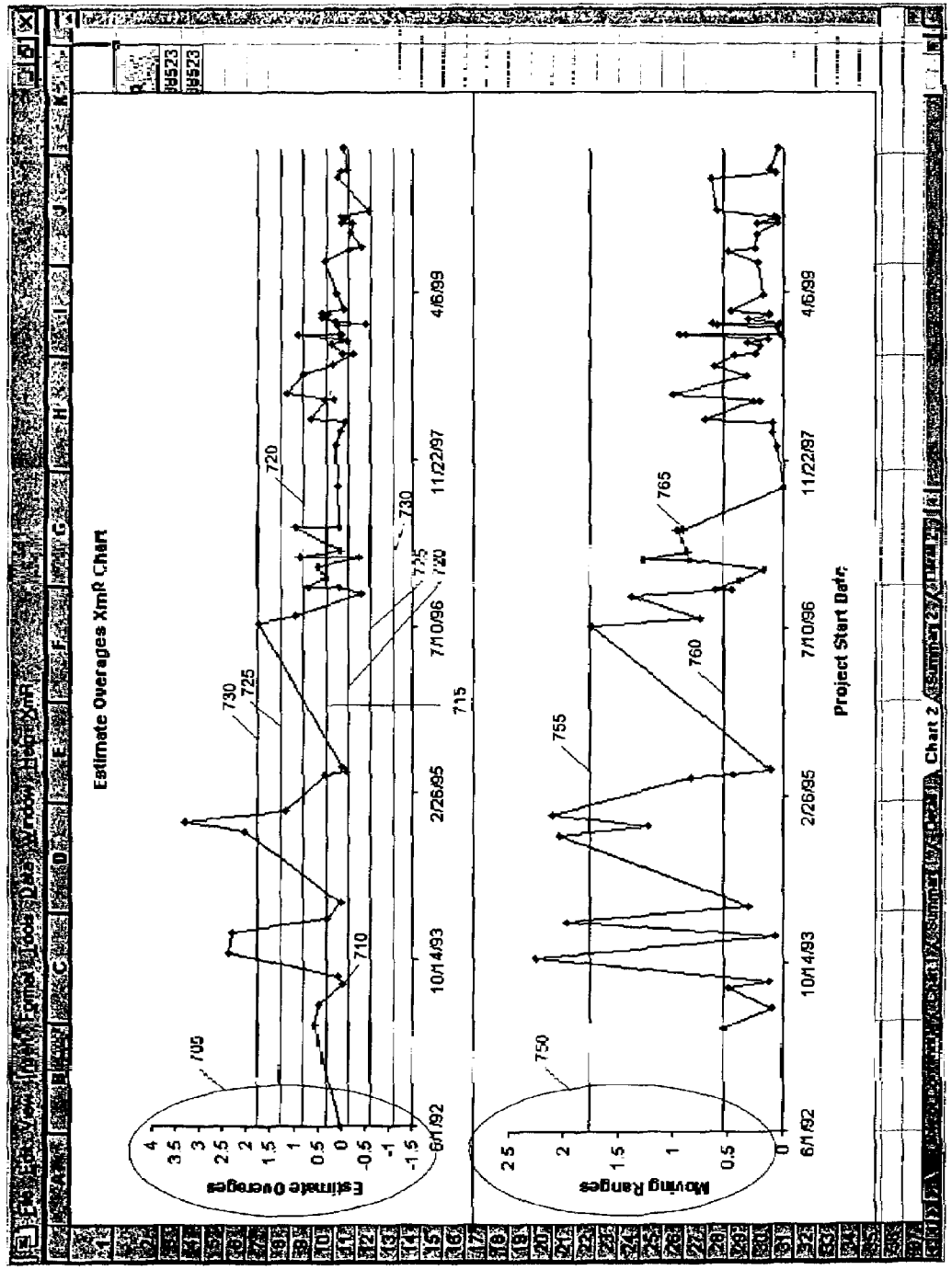
FIG. 7 illustrates a control chart that shows an estimate overage and a moving range associated with the estimated overage.

FIG. 7 illustrates a control chart graph 700 and shows how values other than the cost may be measured. Specifically, control chart graph 700 illustrates how the noncomplying datapoints may be identified using the estimated overage as the variable being investigated. Control chart graph 700 includes an estimated overage graph and a moving range indicator for the overage. Generally, an overage indicates the difference between an estimated value and the actual value. Ideally, as organizations develop more robust development procedures, their estimated cost deviations are reduced. This would be reflected by graphs that are centered on the mean and have less deviation.

The control chart graph 700 generally relates to the control charts described previously with respect to FIGS. 1-6. For example, spreadsheets similar to those described in FIG. 2 may be used to generate the control chart graph 700. Although control chart graph 700 uses an estimated overage, other values and axes may be used. For example, the estimated production or achievement may be plotted. By way of example, FIG. 7 differs from FIGS. 2-6 in indicating that non-cost values may be used.

The estimated overage chart in control chart graph 700 includes an estimated overage axis 705, a control chart line 710, a control chart mean 715, and noncomplying markers 720, 725 and 730 to indicate portions of the control chart line 710 that fall beyond the mean by more than one, two and three standard deviations, respectively.

The moving range graph in control chart graph 700 includes a moving range axis 750 that enables moving ranges to be measured. There are two normative indicators 755 and 760 that indicate portions of the moving range line 765 for values of 0.5 and 1.8, respectively.

Figure 8:
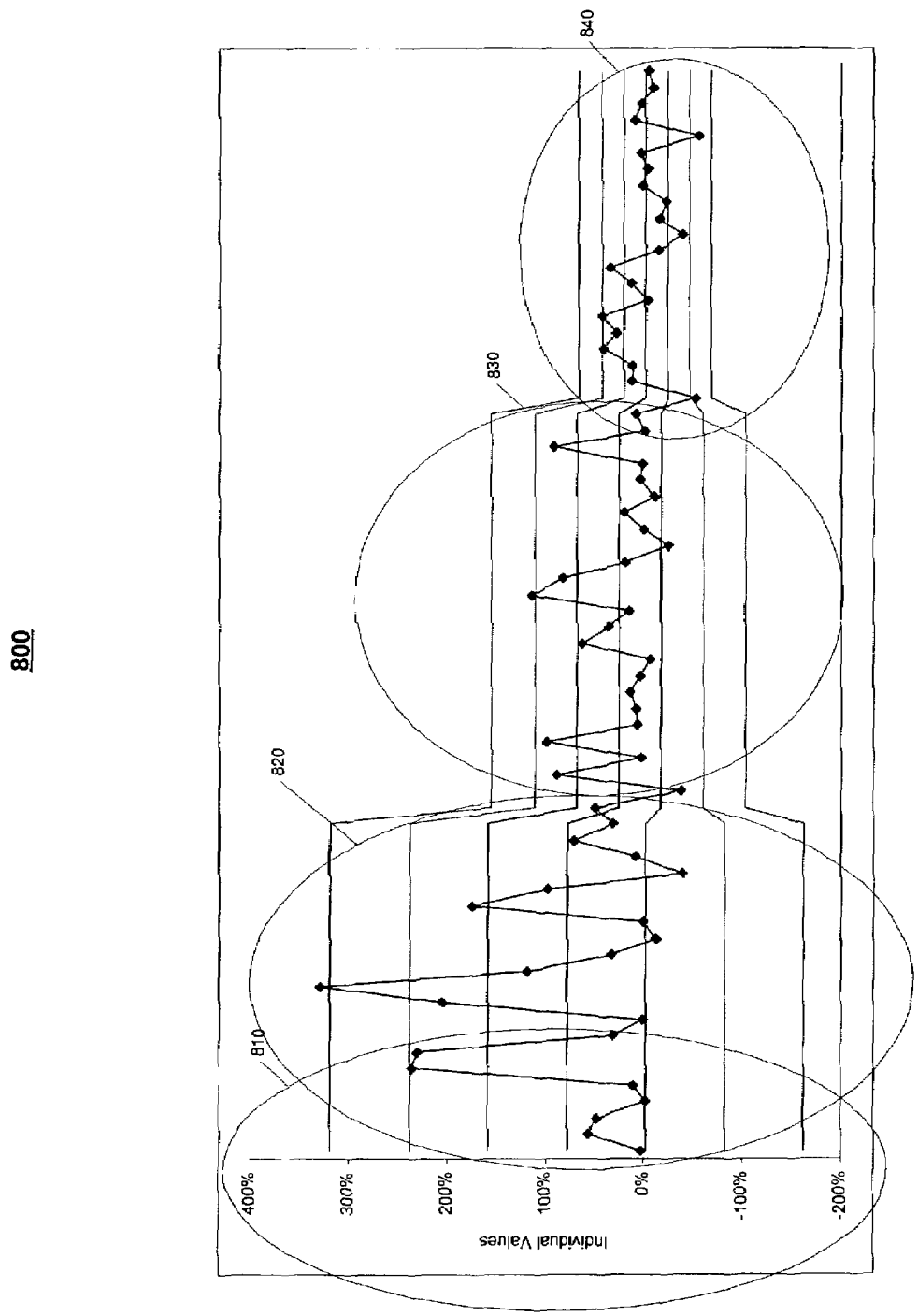
FIG. 8 illustrates a control chart that calculates different control limit values based on different underlying processes.

Referring to FIG. 8, a control chart graph 800 illustrates use of different control limit values throughout the graph. Using different control limit values generates different noncomplying datapoints. These different noncomplying datapoints are identified by using markers particular to each range used to generate the control limit values. In FIG. 8, these markers include standard deviation indicators that are particular to each range. Generally, a different control limit value may be used when the underlying process has changed. In one example, when the underlying process is being modeled, changing the underlying process introduces new factors. It may be advantageous to only compare datapoints using the same underlying process as a better analysis may be performed when the data does not reflect a different process that may generate different results. Additionally, if the control chart is being used to detect anomalies within a process, then changing the control limit values may focus the analysis.

Control chart graph 800 generally relates to the control charts described previously with respect to FIGS. 2-7. However, control chart graph 800 uses axis 810 to reflect control limit values for ranges 820, 830 and 840. Each of the ranges includes a control line that plots the control limit values and a series of markers that indicate the range of noncomplying points. That is, each of the ranges reflects the mean and one, two, and three standard deviations around the mean. Each of the three ranges reflects a different underlying process that may be used. For each range/process in control chart 800, the control limit values, the mean and the standard deviation markers may be generated using different datapoints as inputs.

Figure 9:
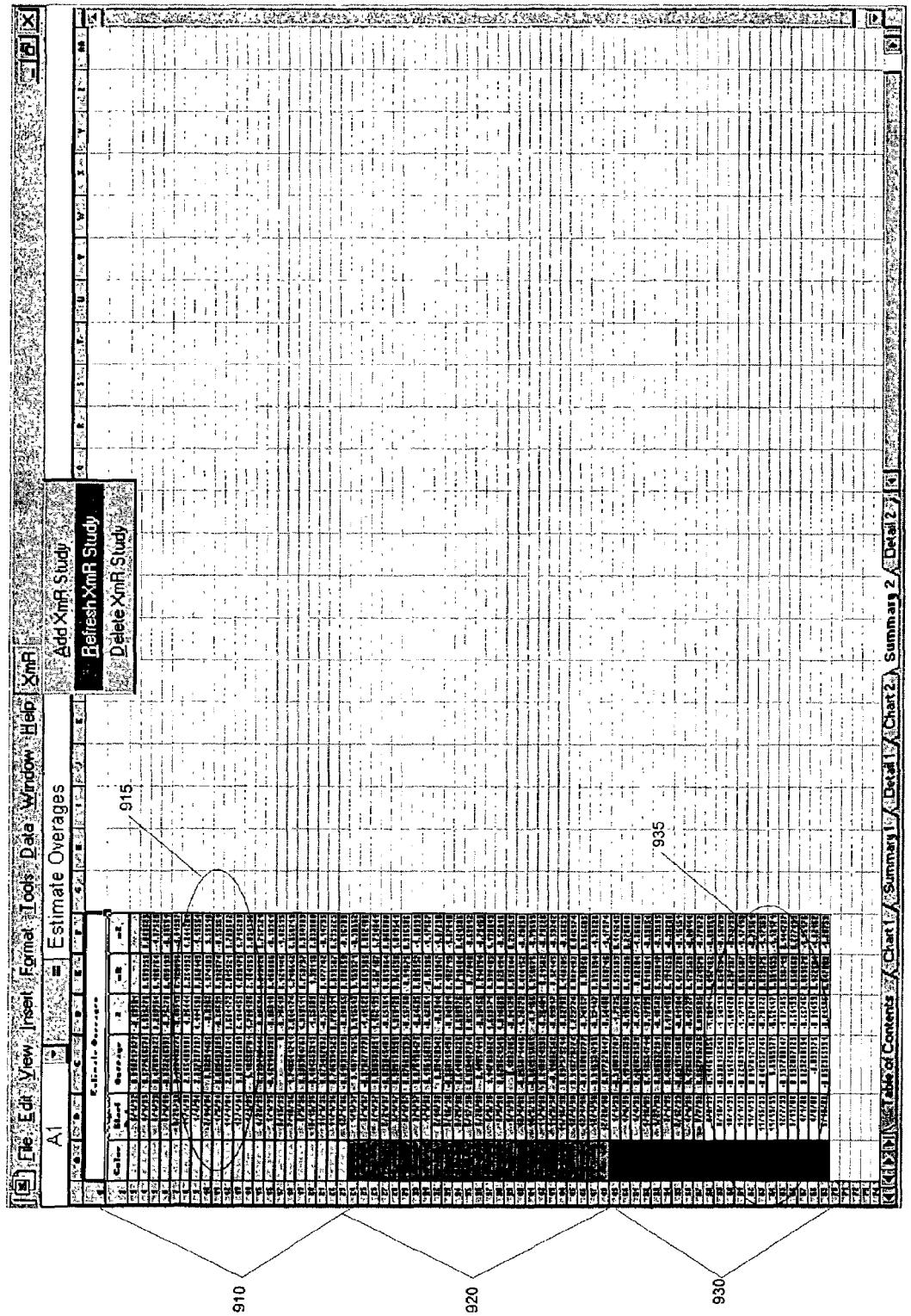
FIG. 9 illustrates a control chart in a spreadsheet that calculates different control limit values based on different underlying processes and highlights noncomplying points within one of the ranges.

Referring to FIG. 9, a control chart 900 illustrates a spreadsheet with three underlying processes. The underlying processes may each have their own set of control limit values such that what constitutes a noncomplying datapoint may vary based on the underlying process. These three underlying processes may be used to generate the three different ranges shown in FIG. 9.

Control chart 900 includes three ranges, as indicated by the three different colors used in the leftmost column of the spreadsheet. Ranges 910, 920, and 930 have their associated control limit values calculated for their respective range. Within each range, noncomplying points are highlighted, as shown by the noncomplying points 915 in range 910 and the noncomplying points 935 in range 930.

The control chart may use different techniques to determine that a different process is in being used. In one example, a user may designate that a different process is being used in response to being polled to identify which processes were used. In another example, the control limit software may analyze the constituent tasks, such as the tasks appearing in FIG. 4, and determine that a different process is being used.

Figure 10:
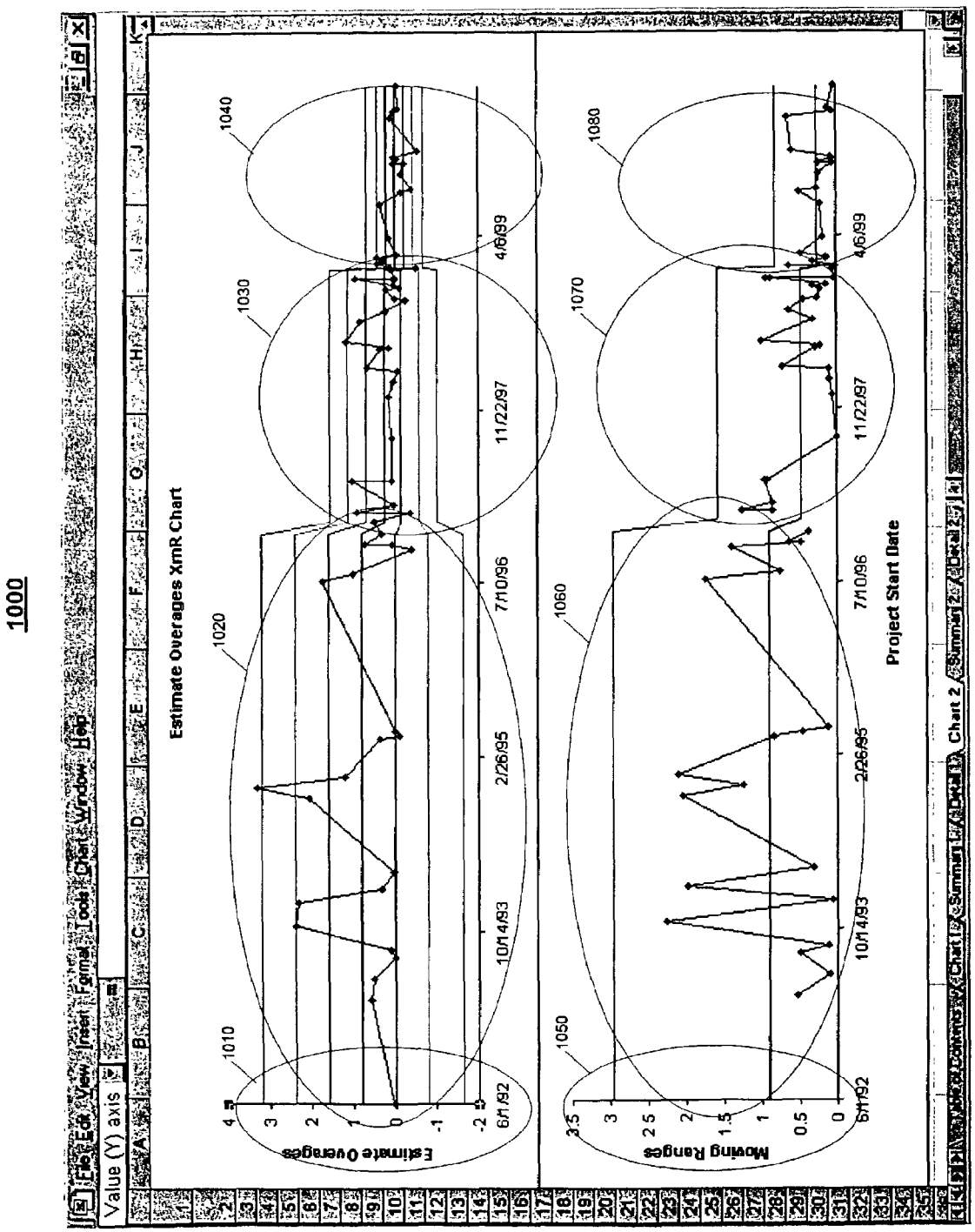
FIG. 10 illustrates a control chart showing the estimated overage and moving range with different control limit values based on the underlying process.

Referring to FIG. 10, a control chart graph 1000 is shown to display control limit values for estimated overages with three underlying processes being used. More specifically, the identified noncomplying datapoints are based on the underlying range and process used. Axis 1010 shows the degree of overestimation for ranges 1020, 1030, and 1040. Generally, the control chart graph 1000 relates to the control chart graphs described previously with respect to FIGS. 1-4 and 7. For example, both the control chart graph 1000 and the control chart graph 700 of FIG. 7 show the degree of overestimation, with a mean and the noncomplying zones plotted against the control line. However, the control chart graph 1000 shows how different process-specific noncomplying zones and means may be displayed.

The moving range indicator for the estimated overage illustrates how the moving range also may feature a different set of moving range indicators, with each of the moving range indicators being associated with one of the three ranges. The moving range axis 1050 shows the degree to which the control line changes between datapoints. Ranges 1060, 1070, and 1080 indicate that, as the processes change and time progresses, the control line indicates there is less deviation.

Figure 11:
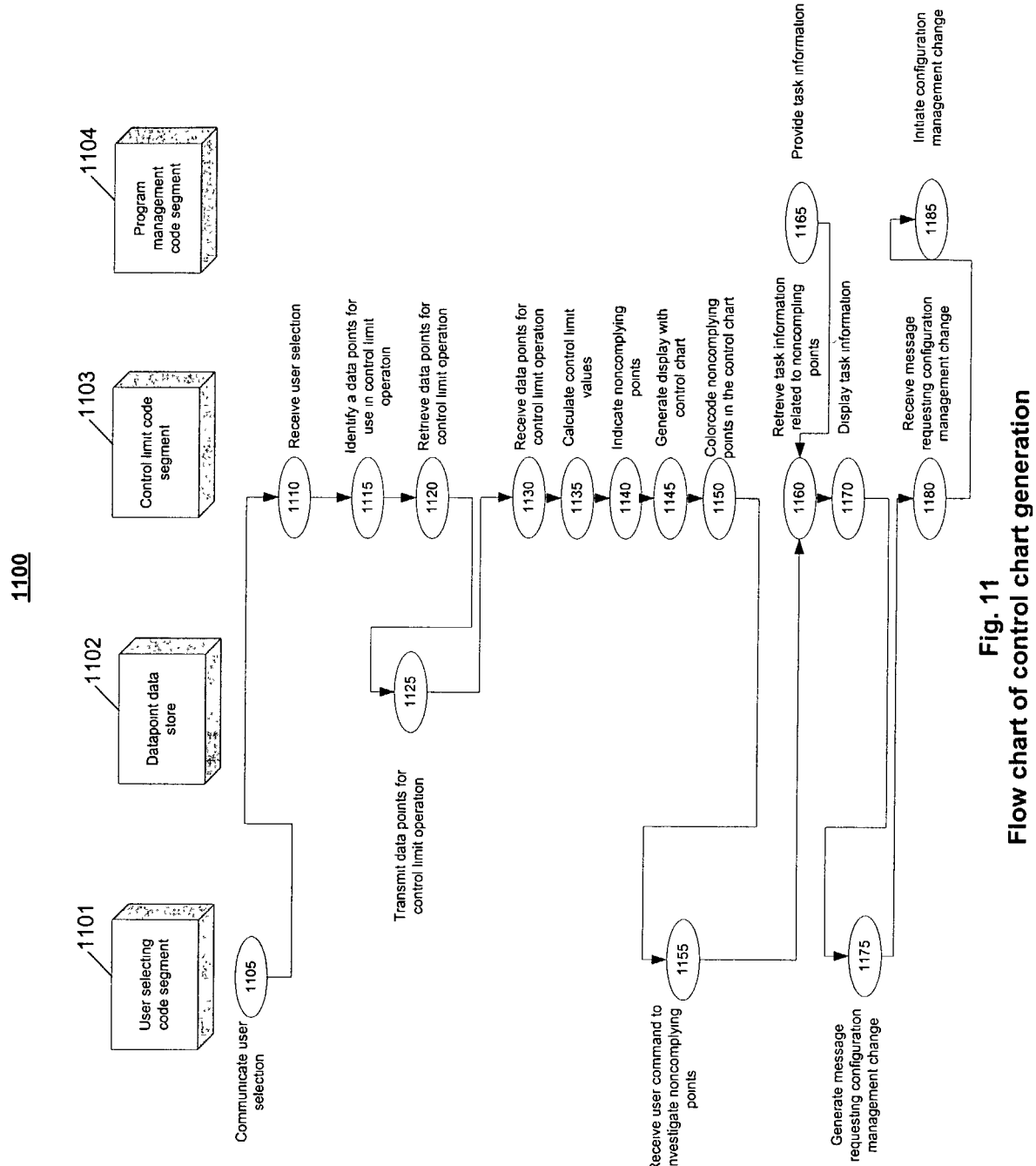
FIG. 11 illustrates a flow chart showing how a computer system may generate an amplified control chart.

Referring to FIG. 11, a flow chart 1100 illustrates how a control chart may be generated and noncomplying points may be identified. In particular, the flow chart 1100 illustrates interaction between a user selecting code segment 1101, a datapoint data store 1102, a control limit code segment 1103 and a program management code segment 1104. The control limit code segment 1103 receives a user selection indicating one or more datapoints to be used in a control limit operation. The control limit code segment 1103 calculates control limit values based on the datapoints. The control limit values indicate one or more noncomplying points that are not within an expected range. The control limit code segment 1103 generates a display relating the control limit values to the noncomplying points, and identifies the noncomplying points in the generated display.

Generally, the systems illustrated in FIG. 11 have been described previously with respect to FIGS. 1-10. For example, the user selecting code segment 1101 and the datapoint data store 1102 may be used in generating the spreadsheet illustrated in FIG. 2. Similarly, the control limit code segment 1103 may be used in generating the control charts described with respect to in FIGS. 2-10. The program management code segment 1104 generally includes a project tracking application or software engineering tool configured to document a software development effort. The program management code segment 1104 may be used to manage financial transactions, track program progress, and/or manage the allocation of resources.

Initially, the user selecting code segment 1101 communicates a user selection to the control limit code segment 1103 (step 1105). The user selection may result from having a user select a range of dates to be used. The user selection also may be done seamlessly and without user intervention. For example, the program may automatically select datapoints that have previously been selected. Alternatively, the user may be polled to select datapoints. The control limit control segment 1103 receives the user selection (step 1110). The control limit code segment 1103 then identifies datapoints for use in the control limit operation (step 1115). Identifying the datapoints may include mapping the user selection into an actual range of datapoints to be used. For example, the user selection may include a label that references a range of datapoints, and the datapoints associated with the label may be retrieved.

The control limit code segment 1103 retrieves the datapoints for the control limit operation from the datapoint data store 1102 (step 1120), which then provides the datapoints (step 1125). Retrieving the datapoints may include accessing a program management application and retrieving parameters that are maintained in that application. The control limit code segment receives the datapoints (step 1130) and calculates the control limit values (step 1135). Calculating the control limit values may include calculating a mean value and a standard deviation.

After calculating the control limit values, the noncomplying datapoints may be identified (step 1140). The noncomplying datapoints may be identified by comparing the datapoints with the standard deviation. Other noncomplying datapoints may be identified by relating a datapoint with its neighboring datapoints. For example, the datapoints may undergo trend analysis to identify a set of datapoints that indicate long-term deviation that merits investigation. For example, if multiple neighboring datapoints occur on the same side of the mean, or beyond a standard deviation, the collection may be identified as a noncomplying datapoint. Similarly, if two out of three datapoints lies in a particular range, those two or three datapoints may be identified as noncomplying datapoints. The control limit code segment 1103 generates a display with the control limit values (step 1145) and color-codes the noncomplying datapoints in the display (step 1150).

The user may elect to investigate noncomplying datapoints (step 1155). Investigating the datapoints may include retrieving more information related to the noncomplying datapoints to identify one or more factors responsible for the deviation. The control limit control segment 1103 may retrieve task information related to noncomplying code segments (step 1160). For example, a display similar to FIG. 4 may be generated. Depending on the system configuration, the program management code segment 1104 may provide the task information from a program management application that is managing and tracking the program under investigation (step 1165).

The control limit code segment 1103 may display the task information (step 1170). The task information may include a detailed cost breakdown, an explanation of the underlying tasks, and/or notes to reviewing managers. After investigating a task associated with a noncomplying datapoint, the user may generate a message requesting a configuration management change (step 1175). For example, the user may request that a different process be started, or that the project be staffed in a different manner. The control limit code segment 1103 receives the message (step 1180) and forwards the message to the program management code segment 1104. In response, the program management code segment 1104 initiates the configuration management change (step 1185).

Other implementations are within the scope of the following claims. For example, the datapoints used in the control chart may be retrieved from a separate and distinct application than the application generating the display.

What is claimed is:

1. A computer-implemented method of relating control limit values to noncomplying points, the method comprising:
   receiving from a user a selection indicating two or more datapoints to be used in a control limit operation;
   identifying two or more processes from which the datapoints were derived;
   calculating a first control limit value for a first process based on one or more datapoints associated with the first process, the first control limit value indicating one or more noncomplying points that are not within an expected range for the first process;
   calculating a second control limit value for a second process based on one or more datapoints associated with the second process, the second control limit value indicating one or more noncomplying points that are not within an expected range for the second process;
   generating a graph by:
      creating, on the graph, a single two dimensional coordinate axis, and
      displaying the first and second control limit values relative to the noncomplying points for at least the first and second processes, such that both of the first and second control limit values are displayed continuously as a series of interconnected parallel steps reflecting the first and second control limit values on the graph and in relation to the single two dimensional coordinate axis; and
   identifying the noncomplying points in the generated graph.

2. The method of claim 1 wherein identifying the noncomplying points includes color-coding the noncomplying points.

3. The method of claim 2 further comprising color-coding the noncomplying points differently than other control limit values.

4. The method of claim 3 further comprising maintaining the color-coding used for datapoints falling in common classification between a control limit chart and a control limit spreadsheet.

5. The method of claim 1 wherein identifying the noncomplying points includes accenting a line in a control chart.

6. The method of claim 1 further comprising retrieving limits for the datapoints corresponding to a key portion of a process.

7. The method of claim 1 further comprising retrieving datapoints used in a program management application that is different than the application generating the display.

8. The method of claim 1 wherein identifying the noncomplying points includes highlighting datapoints in a spreadsheet.

9. The method of claim 1 wherein generating the graph includes displaying a moving range.

10. The method of claim 1 wherein generating the graph includes displaying a relative cost indicator.

11. The method of claim 1 wherein generating the graph includes displaying an estimated overage.

12. The method of claim 1 further comprising enabling the user to launch an investigative agent related to a datapoint appearing in the graph.

13. The method of claim 12 wherein enabling the user to launch the investigative agent includes enabling the user to select the datapoint by acting on a graphical representation of the datapoint.

14. The method of claim 1 further comprising enabling a user to exclude datapoints before calculating the control limit values.

15. The method of claim 1 further comprising enabling the user to operate on a subset of the control limit values.

16. The method of claim 15 wherein enabling the user to operate on the subset of the control limit values includes enabling the user to retrieve one or more constituent tasks related to the control limit values.

17. The method of claim 15 wherein enabling the user to operate on the subset of the control limit values includes enabling the user to modify a task used in calculating the control limit values.

18. The method of claim 15 further comprising interfacing with a program management application and generating a message in response to the user operating on the subset of the control limit values.

19. The method of claim 18 wherein the message includes an automated request for additional information.

20. The method of claim 18 wherein the message includes a change to a task being performed.

21. The method of claim 18 wherein the message includes a change to a configuration determining how the control limit values are calculated.

22. A system configured to relate control limit values to noncomplying points, the system comprising:
a user interface processing component structured and arranged to receive from a user a selection indicating two or more datapoints to be used in a control limit operation;
a process identification component structured and arranged to identify two or more processes from which the datapoints were derived;
a first control limit processing component structured and arranged to calculate a fist control limit value based on one or more datapoints associated with the first process, the first control limit value indicating one or more noncomplying points that are not within an expected range for the first process;
a second control limit processing component structured and arranged to calculate a second control limit value based on one or more datapoints associated with a second process, wherein the second control limit value indicates one or more noncomplying points that are not within an expected range for the second process;
a display processing component structured and arranged to generate a graph by:

displaying the first and second control limit values relative to the noncomplying points for at least the first and second processes, such that both of the first and second control limit values are displayed continuously on the graph as a series of interconnected parallel steps reflecting the first and second control limit values and in relation to the single two dimensional coordinate axis; and
an identifying processing component structured and arranged to identify the noncomplying points in the generated graph.

23. The system of claim 22 wherein the identifying processing component is structured and arranged to color-code the noncomplying points.

24. The system of claim 23 further comprising a differentiating processing component structured and arranged to color-code the noncomplying points differently than other control limit values.

25. The system of claim 24 wherein the differentiating processing component is structured and arranged to maintain color coding for datapoints falling in common classification between a control limit chart and a control limit spreadsheet.

26. The system of claim 22 wherein the identifying processing component is structured and arranged to accent a line in a control chart.

27. The system of claim 22 wherein the user interface processing component is structured and arranged to retrieve limits for the datapoints corresponding to a key portion of a process.

28. The system of claim 22 wherein the user interface processing component is structured and arranged to retrieve datapoints used in a program management application that is different than the application generating the display.

29. The system of claim 22 wherein the identifying processing component is structured and arranged to highlight datapoints in a spreadsheet.

30. The system of claim 22 wherein the display processing component is structured and arranged to display a moving range.

31. The system of claim 22 wherein the display processing component is structured and arranged to display a relative cost indicator.

32. The system of claim 22 wherein the display processing component is structured and arranged to display an estimated overage.

33. The system of claim 22 further comprising an investigating processing component structured and arranged to enable the user to investigate a datapoint appearing in the graph.

34. The system of claim 33 wherein the investigating processing component is structured and arranged to enable the user to select the datapoint by acting on a graphical representation of the datapoint.

35. The system of claim 22 further comprising an excluding processing component structured and arranged to enable a user to exclude datapoints before calculating the control limit values.

36. The system of claim 22 further comprising an analyzing processing component structured and arranged to enable the user to operate on a subset of the control limit values.

37. The system of claim 36 wherein the analyzing processing component is structured and arranged to enable the user to retrieve one or more constituent tasks related to the control limit values.

38. The system of claim 36 wherein the analyzing processing component is structured and arranged to enable the user to modify a task used in calculating the control limit values.

39. The system of claim 36 further comprising a messaging processing component structured and arranged to interface with a program management application and generating a message in response to the user operating on the subset of the control limit values.

40. The system of claim 39 wherein the message includes an automated request for additional information.

41. The system of claim 39 wherein the message includes a change to a task being performed.

42. The system of claim 39 wherein the message includes a change to a configuration determining how the control limit values are calculated.

43. The system of claim 22 wherein the user interface processing component, the control limit processing component, the display processing component, and the identifying processing component are all implemented by a single processor.

44. A computer-readable storage medium having embodied thereon a control limit program for controlling a computer, the computer-readable storage medium comprising:
- a user interface code segment that controls the computer to receive from a user a selection indicating two or more datapoints to be used in a control limit operation;
- a first control limit code segment that controls the computer to calculate a first control limit value based on one or more datapoints associated with the first process, the first control limit value indicating one or more noncomplying points that are not within an expected range for the first process;
- a second control limit code segment that controls the computer to calculate a second control limit value based on one or more datapoints associated with the second process, wherein the second control limit value indicates one or more noncomplying points that are not within an expected range for the second process;
- a display code segment that controls the computer to generate a graph by:
  - creating, on the graph, a single two dimensional coordinate axis, and
  - displaying the first and second control limit values relative to the noncomplying points for at least the first and second processes, such that both of the first and second control limit values are displayed continuously as a series of interconnected parallel steps reflecting the first and second control limit values on the graph and in relation to the single two dimensional coordinate axis; and
- an identifying code segment that controls the computer to identify the noncomplying points in the generated graph.

45. The method of claim 1, wherein receiving from the user the selection includes:
- referencing a first label for the first process associated with a first range of datapoints;
- referencing a second label for the second process associated with a second range of datapoints; and
- using first range and the second range to calculate the first and second control limit values based on referencing the first and second labels.

46. The method of claim 1, further comprising creating other graphs other than the graph with the single two dimensional coordinate axis.

47. The method of claim 1 further comprising:
- identifying a source document with a collection of content;
- performing a preliminary analysis on the collection of content;
- generating a label for select content in the collection of content based on the preliminary analysis;
- selectively importing the select content based on the label; and
- processing the select content as the user selection in order to generate the graph.

* * * * *

UNITED STATES PATENT AND TRADEMARK OFFICE
CERTIFICATE OF CORRECTION

PATENT NO. : 7,673,247 B1  Page 1 of 1
APPLICATION NO. : 10/305101
DATED : March 2, 2010
INVENTOR(S) : Donald J. Nicholson It is certified that error appears in the above-identified patent and that said Letters Patent is hereby corrected as shown below:

In column 11, line 55, in Claim 22, delete "fist" and insert -- first --, therefor.

In column 11, line 62, in Claim 22, delete "a" and insert -- the --, therefor.

In column 11, line 67, in Claim 22, after "by:" insert -- creating, on the graph, a single two dimensional coordinate axis, and --.

In column 14, line 14, in Claim 45, delete "claim 1," and insert -- claim 1 --, therefor.

In column 14, line 23, in Claim 46, delete "claim 1," and insert -- claim 1 --, therefor.

Signed and Sealed this

First Day of June, 2010

David J. Kappos
*Director of the United States Patent and Trademark Office*